UNITED STATES PATENT OFFICE.

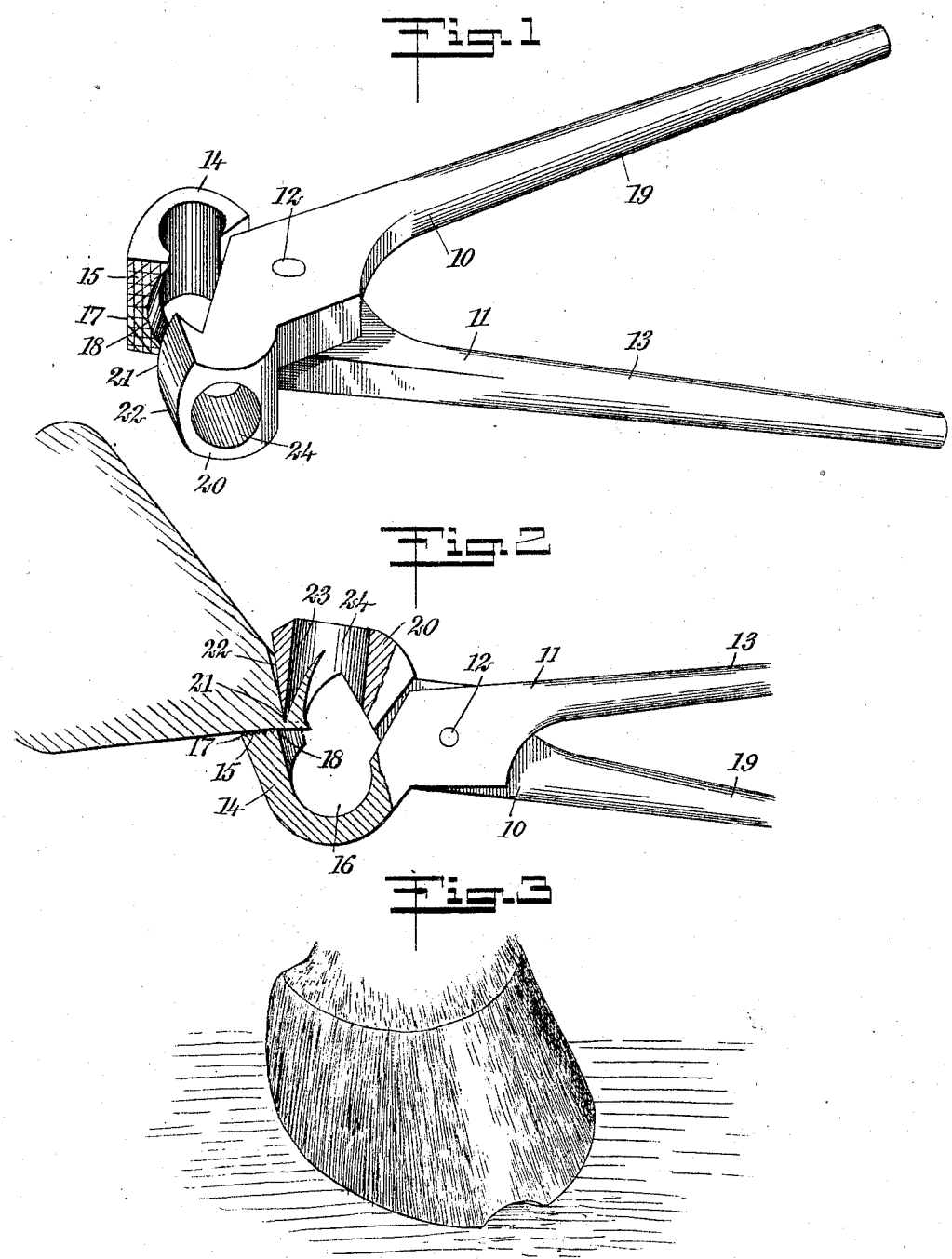

ARTHUR I. MERRIFIELD, OF EAST LEBANON, MAINE.

FARRIER'S TOOL.

No. 927,990.  Specification of Letters Patent.  Patented July 13, 1909.

Application filed November 16, 1908. Serial No. 462,957.

*To all whom it may concern:*

Be it known that I, ARTHUR I. MERRIFIELD, a citizen of the United States, and a resident of East Lebanon, in the county of York and State of Maine, have invented a new and Improved Farrier's Tool, of which the following is a full, clear, and exact description.

This invention relates to certain improvements in farrier's tools, and more particularly to a special tool for use in trimming the front portion of a horse's hoof to form a curved recess into which the clip on the horseshoe may extend.

It is common practice to provide horseshoes with upwardly extending clips, flanges or projections at the front edge thereof which engage with the front side of the hoof, to more firmly hold the shoe in position and prevent rearward movement thereof. This clip also serves to protect the front portion of the hoof and prevent the latter from injury.

In order to provide the necessary recess for the reception of this clip, it is necessary to cut away a portion of the hoof to form a curved recess of the exact size and shape to receive the clip. This is a rather difficult operation when a knife is used, as it is necessary to cut away a small portion at a time and continually fit the shoe in place until it is found that the desired amount of the hoof has been removed.

The object of my invention is to provide a simple tool in which this curved recess may be cut at a single operation and, furthermore, cut with absolute accuracy and precision.

Reference is to be had to the accompanying drawings forming a part of this specification, in which similar characters of reference indicate corresponding parts in all the figures.

Figure 1 is a perspective view of a tool constructed in accordance with my invention; Fig. 2 is a longitudinal view of the tool while in use, a portion thereof being shown in section; and Fig. 3 is a perspective view of a horse's hoof having a recess cut therein by the use of my improved tool.

The complete tool is formed of two members 10 and 11 pivoted together by a pin 12 so that they operate in substantially the same manner as an ordinary pair of pincers or tongs. Each member is provided with an operating jaw at one end and with a handle at the opposite end, the two jaws bearing such a relationship to each other that they do not come into direct engagement but move past each other with a cutting or shearing action.

The member 11 is provided with a handle 13 and a jaw 14, which latter terminates in a roughened surface 15 at substantially right angles to the general direction of the length of the tool. The jaw is curved so as to form an inner chamber or recess 16, which is open at both ends and into which the material cut away from the hoof may fall.

The outer edge 17 of the roughened surface 15 may be of any form desired, but the inner edge 18, that is, the edge toward the pivot pin 12, is convex, the curvature corresponding to the curvature which it is desired to give the recess in the hoof. The edge 18 constitutes a shearing edge, and the portion below said edge presents a curved surface extending downwardly to the recess or chamber 16.

The member 10 is provided with a handle 19 and a jaw 20 which terminates in a curved cutting edge 21, the curvature of this edge corresponding to the curvature of the edge 18 of the other member, and bears such relationship thereto that as the handles 13 and 19 are brought toward each other, the curved edge 21 passes closely adjacent the curved edge 18 so that these two edges have a shearing or cutting action upon any material interposed therebetween.

The cutting edge 21 is at the intersection of an outer curved surface 22 and an inner curved surface 23, which surfaces are inclined in respect to each other. The inner curved surface 23 merges into, and forms a portion of, the surface of an opening or passage 24 extending up through the jaw and open at both ends. This passage is substantially cylindrical and serves to receive the portion being cut away from the hoof during the use of the tool, as is clearly indicated in Fig. 2.

In the use of my improved tool, the hoof is lifted up and the roughened surface 15 is placed against the front side of the hoof while the curved cutting edge 21 of the jaw 20 is placed in engagement with the under surface or bottom of the hoof. Upon bringing the two jaws of the tool together, the cutting edge 21 enters the hoof to remove a curved wedge-shape piece and to leave a recess in the hoof to receive the upwardly extending clip of the shoe. The curvature of the cutting edges 18 and 21 corresponds to the curvature of the clip on the shoe, so that as soon as the tool has been used to cut the hoof, no further trimming, adjusting or fitting is necessary. The entire operation is performed in a single step and a perfect fit of the shoe clip is insured.

Having thus described my invention, I claim as new and desire to secure by Letters Patent:

A farrier's tool comprising a pair of pivoted members, one of said members having an upwardly extending jaw provided with a bearing surface and a concave inner shearing face intersecting said roughened face in a curved cutting edge, and the other of said members having a downwardly extending jaw provided with a curved cutting edge adapted to pass adjacent the first mentioned cutting edge, and also provided with a passage or opening extending through said jaw at substantially right angles to said roughened surface and adapted to receive the material cut away by said tool during the operation thereof.

In testimony whereof I have signed my name to this specification in the presence of two subscribing witnesses.

ARTHUR I. MERRIFIELD.

Witnesses:
GEORGE A. GOODWIN,
H. B. ROWE.